Oct. 18, 1960 H. L. LEVI 2,956,685

VISIBLE PHONOGRAPH RECORD RACKS

Filed Sept. 18, 1959 2 Sheets-Sheet 1

INVENTOR.
HANS L. LEVI
BY
ATTORNEY

Oct. 18, 1960 H. L. LEVI 2,956,685

VISIBLE PHONOGRAPH RECORD RACKS

Filed Sept. 18, 1959 2 Sheets-Sheet 2

INVENTOR.
HANS L. LEVI

BY

ATTORNEY 2,956,685

VISIBLE PHONOGRAPH RECORD RACKS

Hans L. Levi, Chappaqua, N.Y., assignor to Art & Industry, Inc., New York, N.Y., a corporation of New York Filed Sept. 18, 1959, Ser. No. 840,823

2 Claims. (Cl. 211—40)

This invention relates to phonograph record racks.

The invention is particularly directed to a holder or rack for disk-shaped records wherein the records are held in elevated position in plain view of the observer.

A difficulty found in conventional record holding devices is that no simple means is provided for holding the disk records in elevated position in a manner to facilitate removal of a selected record from the rack.

According to the invention, there is provided a rack formed of a plurality of hingedly mounted wire frames defining upright spaced supports for a plurality of disk records. The frames are joined by inverted channel members and are adapted to be swung to nested position at a slight angle to the vertical and supported by fixed end frames.

A principal object of the invention therefore is to provide a wire rack for holding a plurality of disk-shaped records in spaced parallel array at a slight angle to the vertical in full view of the observer.

Another object of the invention is to provide a wire rack for holding a plurality of hingedly mounted phonograph disk-shaped records at a slight angle to the vertical and in movable relationship whereby removal of a selected record is facilitated.

A further object is to provide a rack for phonograph disk-shaped records that is attractive in appearance and is simple in construction and can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
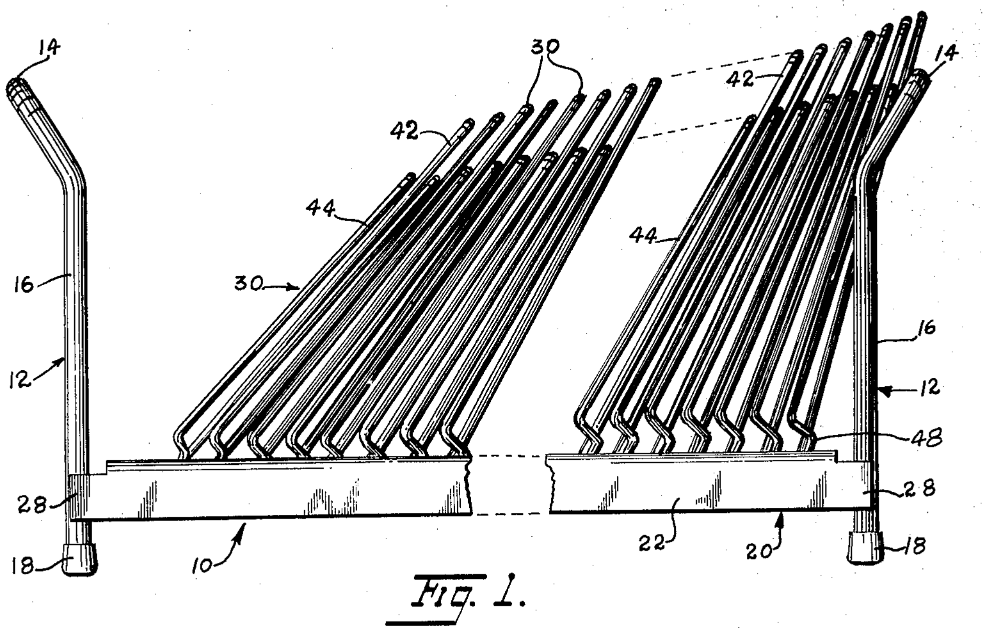
Fig. 1 is a side elevational view of a phonograph disk record rack embodying the invention, parts being broken away and marked to indicate length, the frames being shown swung to non-vertical position.
Figure 2:
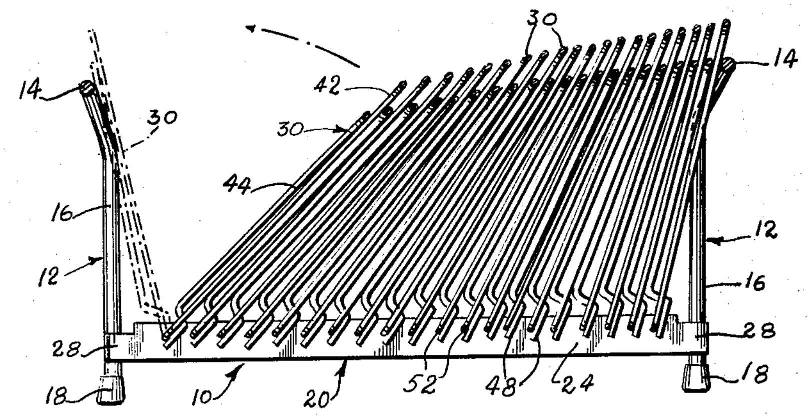
Fig. 2 is a sectional view through the center of the rack shown in Fig. 1, on a reduced scale, a record-holding frame being shown in separated moved position in dot-dash lines.
Figures 3, 4, 5, 6, 7, 8:
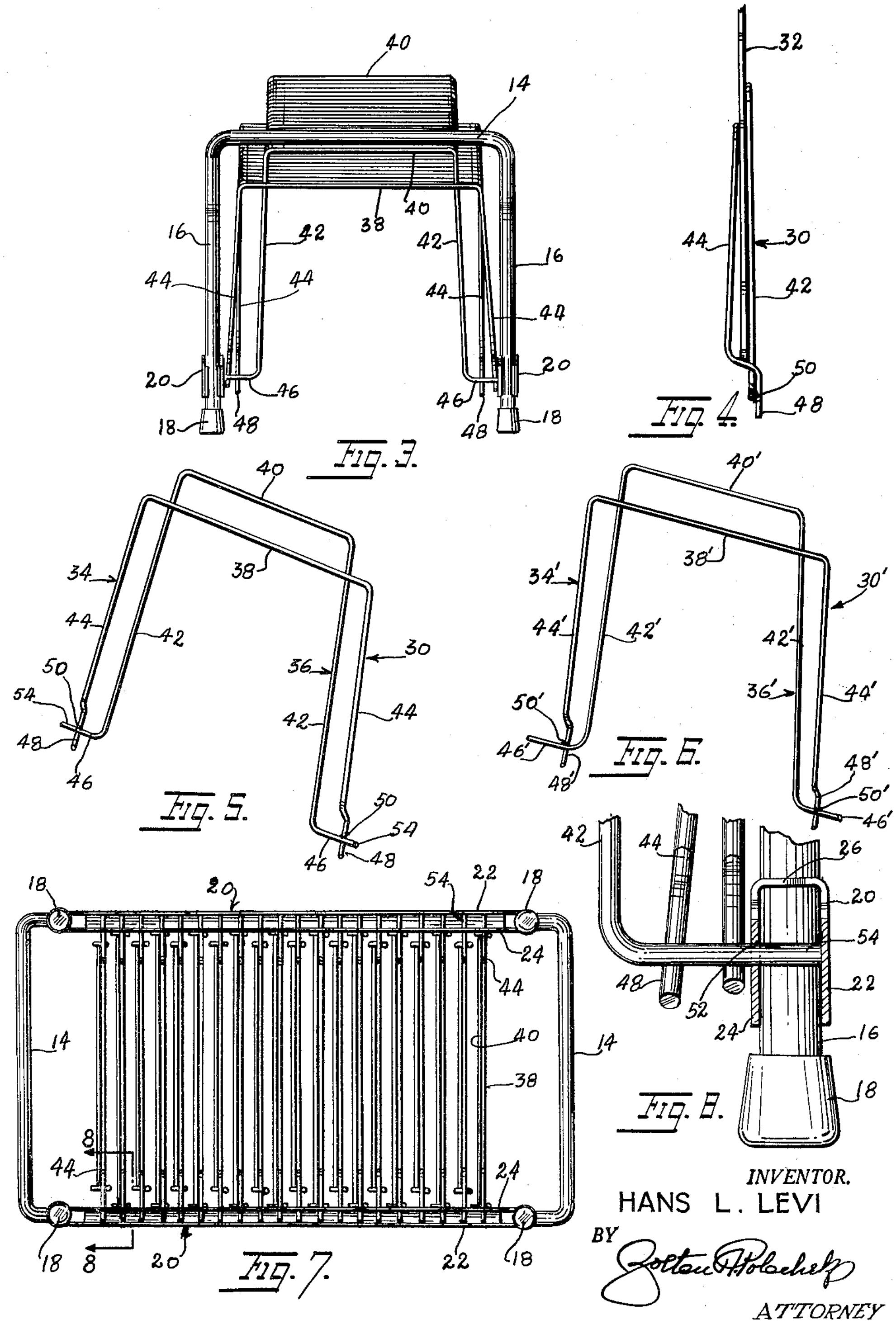
Fig. 3 is an end elevational view of the rack of Fig. 1.
Fig. 4 is an edge view of one of the phonograph record holding frames of the rack of Fig. 1.
Fig. 5 is a perspective view of one form of the phonograph record holding frames.
Fig. 6 is a similar view of another form of phonograph record holding frame.
Fig. 7 is a bottom plan view of the rack of Fig. 1, with the frames shown in truly vertical position.
Fig. 8 is an enlarged sectional view taken on the line 8—8 of Fig. 7.

Referring in detail to the drawings, a rack or holder, for holding a plurality of phonograph records of disk-shape, embodying the invention is shown in Fig. 1 and is designated generally by the reference numeral 10. The rack 10 is rectangular in plan as seen in Fig. 7 and is formed of metal. The rack comprises end frames 12 of heavy round wire stock, of inverted U-shape with the bight portion 14 thereof slightly offset from the plane of the legs 16, 16. The tips of the legs are fitted with plastic or rubber caps 18 to prevent marking of furniture and the like.

Channel-shaped rails or bars 20 connect the bottom ends of the legs 16, 16 of the end frames. The rails are formed of sheet metal and have outer and inner side walls 22 and 24, respectively, and a top wall 26. The side walls have extensions 28 which span the legs 16 of the end frames and are fastened thereto by soldering or welding.

A plurality of frames 30 for supporting a plurality of disk-shaped phonograph records 32 (Fig. 4) are hingedly secured to the channel rails 20. Referring to Figs. 5 and 6, each frame 30 consists of a pair of nested inverted U-shaped wires 34 and 36 of light stock. The bight portion 38 of wire 34 is straight and longer than the straight bight portion 40 of wire 36, and the leg portions 42 of wire 36 are straight and longer than the leg portions 44 of wire 34. The leg portions 42 of wire 36 are formed with laterally extending feet portions 46 and the leg portions 44 of wire 34 are formed with feet portions 48 offset from the plane of the leg portions 44. The offset feet portions 48 of wire 34 are preferably fastened to the laterally extending feet portions 46 of wire 36 by spot welding, as indicated at 50. The construction and arrangement of the wires 34 and 36 of the frame are such that the bight portion 38 of the wire 34 is wider than the bight portion 40 of the wire 36 and rests against the legs 42 of the wire 36 on one side thereof, whereas the offset feet portions 48 of the wire 34 are fastened to the feet portions 48 of the wire 36 at the other side of the leg portions 42 of wire 36 whereby due to the inherent springiness of the wires, the wires are spring pressed against each other. The welded connections 50 of the wires serve as fulcrum points permitting a slight separation of the remainder of the wires away from each other so that a record 32 may be inserted therebetween as seen in Fig. 4.

The inner walls 24 of the channel-shaped rails 20 are provided with a series of aligned socket bearing openings 52 so that the frames 30 are hingedly mounted on the channel-shaped rails 20 by journaling the extremities 54 of the feet portions 46 of wires 34 in the socket openings 52 as seen in Fig. 8.

It will be noted that in the frame 30 shown in Fig. 5, the feet portions 48 of wire 34 cross the feet portions 46 of wire 36 at points adjacent the outer ends of the feet portions 46, whereas in the frame 30' shown in Fig. 6, the feet portions 48' cross the feet portions 46' at points adjacent the inner ends of feet portions 46'. In all other respects, the frame 30' in Fig. 6 is similar to the frame 30 in Fig. 5 and similar reference numerals with primes are used to point out similar parts. By reference to Fig. 7, it will be seen that the frames 30 and 30' of Figs. 5 and 6, respectively, are arranged alternately in the rack, starting with frame 30 of Fig. 5 at the right-hand side. By reason of this arrangement, the bight portions 40 of wire 36 are in parallel, the bight portions 38 are in parallel, the legs 42 of wire 36 are in parallel with each other, but the legs 44 form two aligned rows as seen in Fig. 3. The bight portions 40 of wire 36 are arranged beyond the bight portions 38 of wire 34 and thus provide convenient handles for swinging the frames 30.

In use of the rack 10, a covered phonograph disk record 32 is mounted in a frame 30 by manually pushing the bight portions 38 and 40 of the wires 34 and 36 in opposite directions thereby separating the wires sufficiently to permit insertion of the record to the position shown in Fig. 4. The wires clamp the record in inserted position, with a peripheral portion of the record above the frame, which portion may contain data for identifying the record. The record rests upon the shoulders formed by the offset feet portions 48 of the legs 44 of wire 34. When the record is mounted in clamped position in the frame 30, the frame is swung toward one end of the rack into nested position with the other frames 30 of the rack. In order to remove a selected record, the frame or frames are swung to one side of the selected record to the opposite end of the rack and the wires 34 and 36 of the frame 30 containing the selected record are separated by pushing the wires in opposite directions permitting the record to be lifted out of the frame. The frames are readily swingable to either end of the rack facilitating mounting and removal of the records. The end frames serve as abutments for supporting the swung frames.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A rack for disk-shaped phonograph records comprising a rectangular-shaped frame including end frames constituted by inverted U-shaped wires, channel-shaped metal rails connecting the bottom ends of said end frames, a plurality of wire record-supporting frames connected to the channel-shaped metal rails, each frame constituted by a pair of inverted U-shaped wires rigidly connected at their bottom ends, the bight portion of one wire arranged outwardly beyond the bight portion of the other wire, the outwardly arranged bight portions being in parallel and serving as handles for manipulating the frames, the end frames serving as abutments for the frames when the latter are swung from the vertical position, the hinge connection between the record-supporting frames and the channel-shaped metal rails consisting of laterally extending feet portions on the legs of one wire of the frame, said channel-shaped metal rails having a series of aligned socket openings in one wall thereof receiving said laterally extending feet portions, one of said U-shaped wires tapering inwardly from its connected end whereby its bight portion exerts a clamping action against a supported record.

2. A rack for disk-shaped phonograph records comprising a rectangular-shaped frame including end frames constituted by inverted U-shaped wires, the bight portions of said frames being offset outwardly of the plane of the leg portions of the frames, channel-shaped rails connecting the bottom ends of the leg portions of said end frames, a plurality of wire record-supporting frames connected to the channel-shaped metal rails, the inner walls of said rails having spaced alignment socket openings therein, each record-supporting frame constituted by a pair of inverted U-shaped wires rigidly connected at their bottom ends, the bight portion of one wire arranged outwardly beyond the bight portion of the other wire, the outwardly arranged bight portions being in parallel and serving as handles for manipulating the frames, the connection of the pair of wires constituted by crossing-feet of the wires welded to each other, the connection between the record-supporting frames and the channel-shaped rails constituted by extensions on the feet of one wire of the pair journalled in the socket openings in the inner walls of the channel-shaped rails, one of said U-shaped wires tapering inwardly from its connected end whereby its bight portion exerts a clamping action against a supported record.

References Cited in the file of this patent

UNITED STATES PATENTS

| | | |
|---|---|---|
| 339,173 | Heaton | Apr. 6, 1886 |
| 471,858 | Hamlin | Mar. 29, 1892 |
| 570,465 | Dilley | Nov. 3, 1896 |
| 1,032,385 | Douglass | July 16, 1912 |
| 1,682,667 | Eifel | Aug. 28, 1928 |
| 2,034,116 | Palen | Mar. 17, 1936 |

FOREIGN PATENTS

| | | |
|---|---|---|
| 213,017 | Great Britain | of 1929 |